F. HUMPHREY.
Coffee Roaster.

No. 53,148. Patented March 13, 1866.

Witnesses:

Inventor:

UNITED STATES PATENT OFFICE.

FENTON HUMPHREY, OF PHILADELPHIA, PENNSYLVANIA.

COFFEE-ROASTER.

Specification forming part of Letters Patent No. 53,148, dated March 13, 1866.

*To all whom it may concern:*

Be it known that I, FENTON HUMPHREY, of Philadelphia, in the county of Philadelphia and State of Pennsylvania, have invented a new and useful Article for Roasting Coffee and other Grains; and I do hereby declare that the following is a full, clear, and exact description of the construction and operation of the same, reference being had to the annexed drawings, making a part of this specification, in which—

Figure 1:
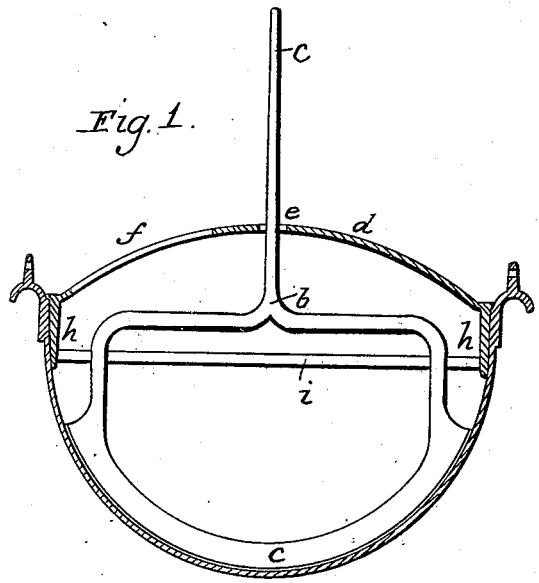
Figure 2:
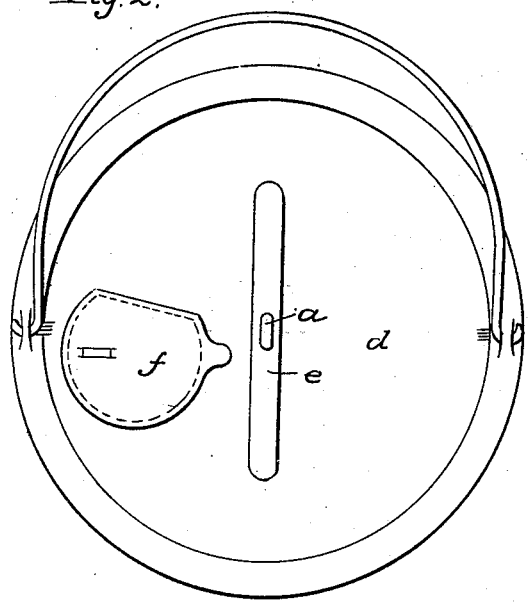

Figure 1 is a transverse section; Fig. 2, a top view of the same.

Like letters represent like parts.

In Fig. 1, *a b c* represent that part of the apparatus for distinction called a "pedal." An oscillating motion can be given the same by means of a wire, one end of which being attached to the top of the pedal, (marked *a*,) the other held in the hand of the operator. Near the center of the cover (marked *d*) is a longitudinal opening, *e*, through which the pedal *a b c* is operated.

At the point *f* in the cover is a small opening, designed for testing coffee or grain while it is being roasted. This is done by inserting a common table-spoon through the opening and bringing some of the grains to the light, where its complexion can be seen.

The cover also contains two ears or drops, (marked *h h*,) one on each side, for the purpose of supporting the shaft *i*, on which the pedal *a b c* is hung. Said pedal being placed in the exact center or radius of the curve, or bottom of the kettle, it will necessarily be equidistant to all parts of the same.

It will be seen that the shaft supporting the pedal could be made to pass through the sides of the kettle, and thus do away with the drops projecting from the cover, (marked *h h*,) rendering the cover entirely separate from the shaft or moving apparatus; but this would make the invention only useful for roasting purposes, whereas by connecting the pedal to the cover, as aforesaid, nothing is lost in the principal operation of roasting, while much is gained by the double advantage of the kettle for other domestic purposes.

The operation is simple: Coffee being placed in the vessel, over a slow fire, to the depth of one inch, or as high up as the shaft on which the pedal is hung, and a movement given the pedal by means of a wire, as aforesaid, a gradual and constant change in the mass of coffee takes place at each motion of the pedal until the whole is evenly roasted. The coffee at the bottom of the kettle being removed, other portions above fall to the bottom. Thus every motion of the pedal displaces the grain resting on the bottom of the vessel.

The kettle is made of cast-iron in a semi-spherical form, although experiments have shown that a vessel made in the form of a cylinder having a pedal suitably adapted, and hung in manner described, will answer a tolerable good purpose.

What I claim, and desire to secure by Letters Patent, is—

A semi-spherical vessel for roasting coffee and other grains, with the cover *d*, having slot *e*, aperture *f*, and depending ears *h h*, in combination with the agitating device *a b c*, substantially as and for the purposes set forth.

FENTON HUMPHREY.

Witnesses:
W. B. HARMON,
W. H. BENCKERT.